Jan. 23, 1934. C. W. MILLER ET AL 1,944,256
MOTOR BUS POWER UNIT
Filed Sept. 18, 1930 3 Sheets-Sheet 3
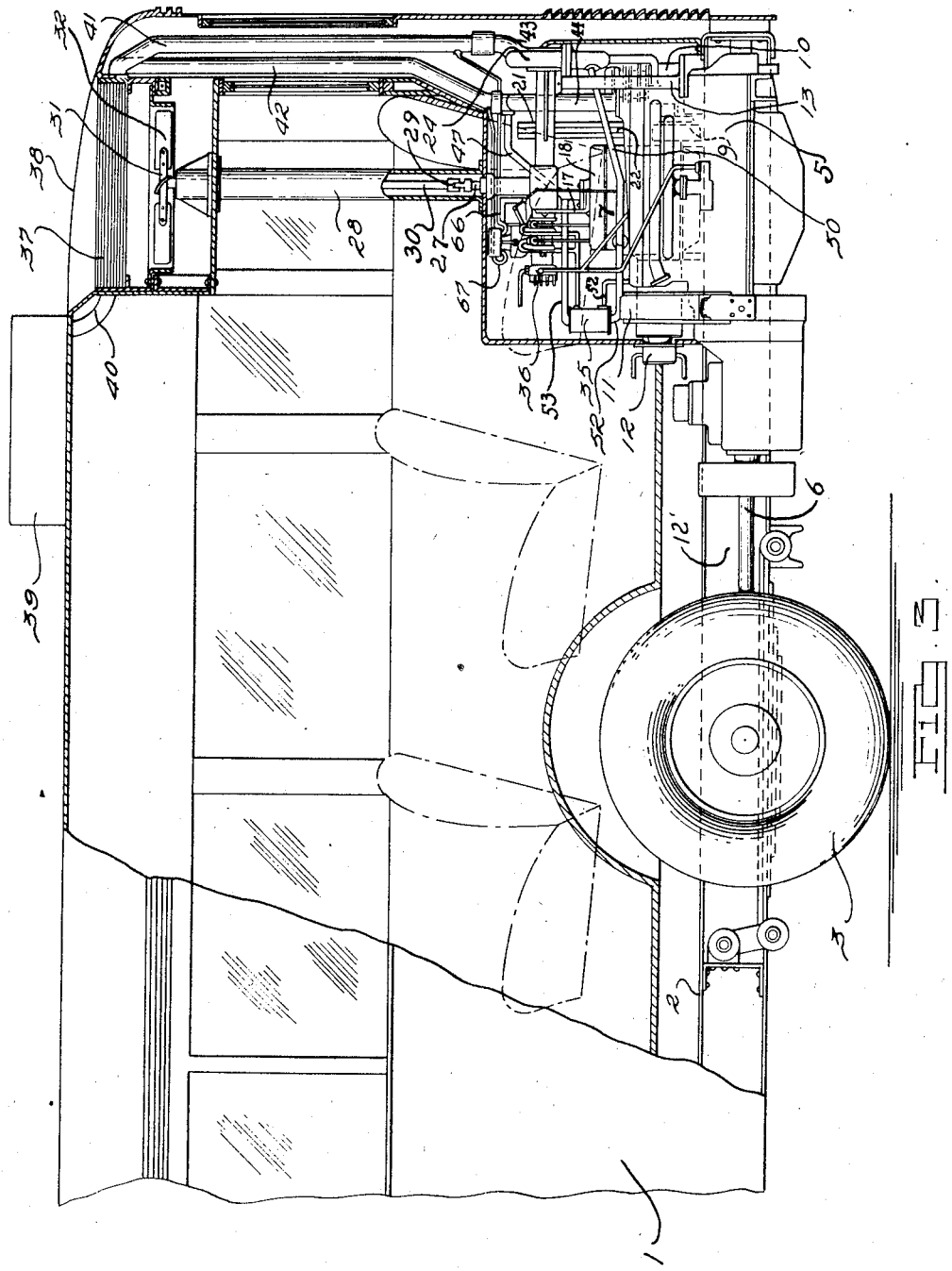
INVENTOR
CLARENCE W. MILLER AND
BY GILBERT C. GOODE.
ATTORNEY Patented Jan. 23, 1934

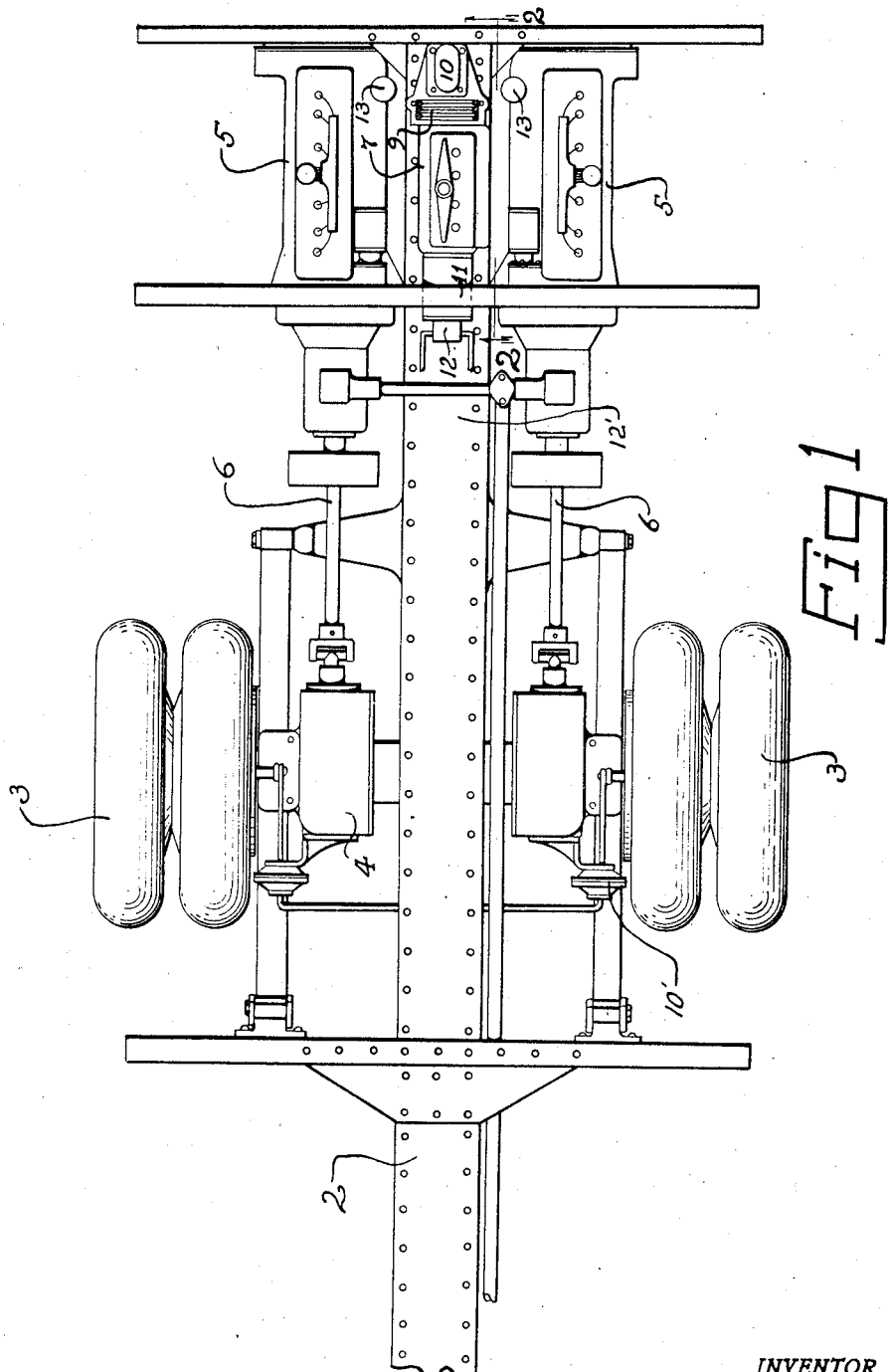

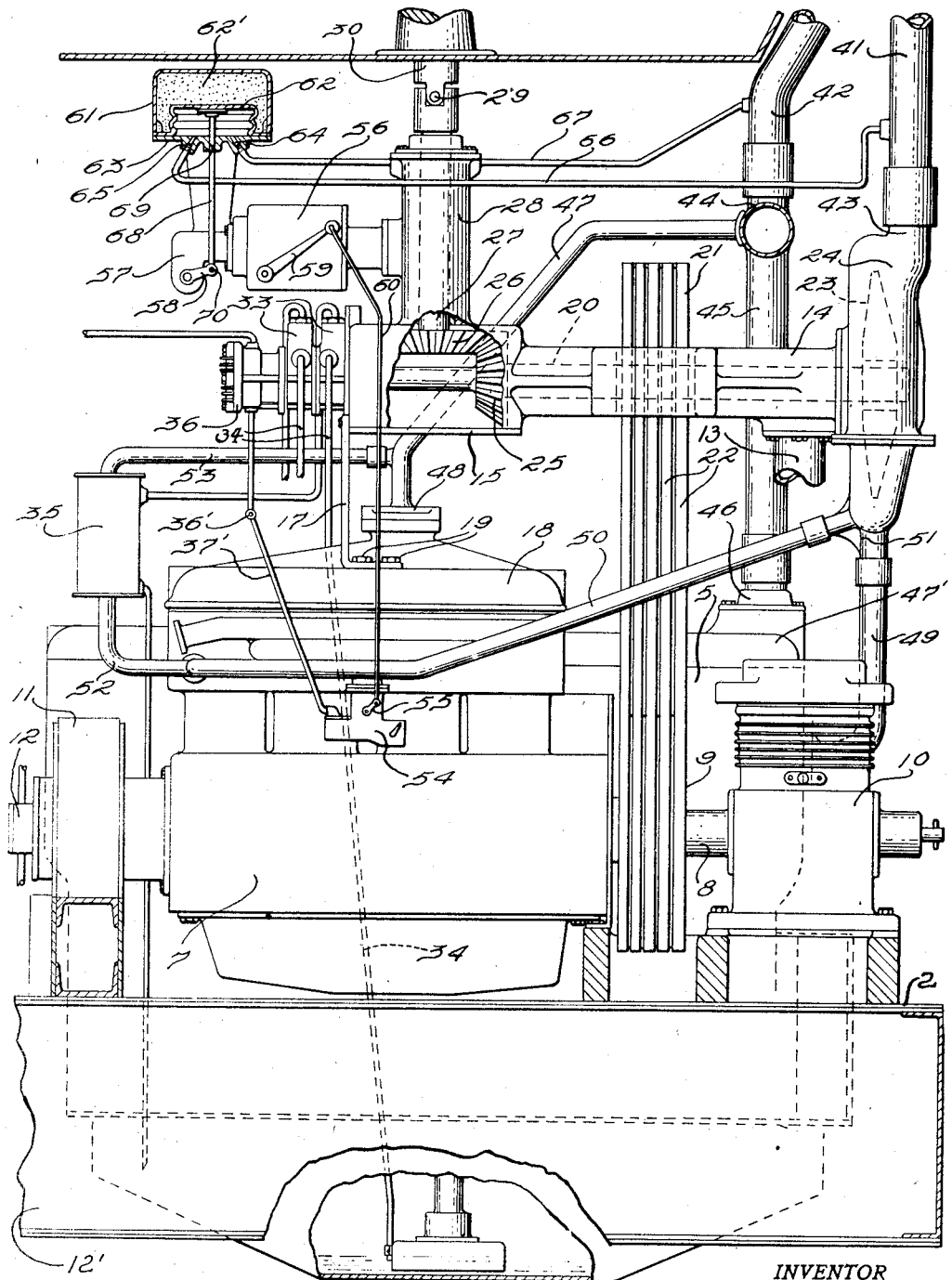

1,944,256

UNITED STATES PATENT OFFICE 1,944,256

MOTOR BUS POWER UNIT

Clarence W. Miller, Detroit, and Gilbert C. Goode, Birmingham, Mich., assignors to Chrysler Corporation, Detroit, Mich., a corporation of Delaware Application September 18, 1930
Serial No. 482,803

9 Claims. (Cl. 123—2)

This invention relates to an improved power unit for a motor bus.

In vehicle buses of the large, heavy duty type it has heretofore been customary to drive such auxiliary equipment, as a generator, an air compressor for the breaking system, fan and water pump of the cooling system and an oil pump, by the same motors which are used to propel the vehicle. Vehicles of this type generally have an enormous weight which requires extremely low gear ratios for low and second speeds in order to start the vehicle in motion and to pull the latter up hills. During low and second speed driving, the motors are operated at a comparatively high rate of speed and the auxiliary equipment is accordingly driven at increased speeds. In many cases the auxiliary equipment is actually driven at speeds which are not only unnecessary, but also materially injurious. The driving of the apparatus at unnecessary high speeds consumes a substantial amount of power which is uselessly expended.

The disadvantage of driving the generator, for example, by the same motor by which the driving wheels are driven is a serious one for during low and second speed operation of the vehicle the generator is operated at an over-load rate. In order to prevent excessive over-loading of the generator during these stages, the generator is constructed so as to operate at a slight over-load during first and second speeds and as a result it is driven at an under-load rate at high speed operation of the vehicle. Such driving of a generator at speeds below its most efficient operating stage is extremely wasteful.

During idling of a power unit in which the cooling medium pump is driven by the motor which propels a vehicle, frequently the circulation of the cooling medium and the speed of the pump is insufficient to maintain the cooling medium and engine within desired temperature limits. When the vehicle is at rest and the engine is idling the current of air which is normally created by forward movement of the vehicle cannot be relied upon to assist the fan in reducing the temperature of the cooling medium and as circulation of the cooling medium is normally reduced during idling, the temperature condition is aggravated.

The main objects of the invention are to provide an improved power unit which has a pair of motors, one for driving each rear wheel of the vehicle; to provide an auxiliary motor for supplying the power required by the auxiliary apparatus, such as the generator; oil, water and fuel pumps, fan and air compressor with which bus motors are equipped; to provide an auxiliary motor of this type which may be operated at different speeds than the driving motors and which may be allowed to continue to operate, if desired, after the driving motors have been stopped; and to provide means for driving the generator of the auxiliary apparatus independently of the driving motors so as to obviate over-loading of the generator at high speed operation of the driving motors, as, for example, during starting of a vehicle in low and second speeds, and to obviate operation of the generator at inefficient running speeds such as during slow driving of the vehicle in high gear.

Other objects of the invention are to provide a common cooling system for the three motors; to provide means for operating the water pump of the cooling system and the fan thereof independently of the driving engines so as to provide a more rapid circulation of the cooling medium during slow speed operation of the engines than at high speed operation thereof, if necessary in order to maintain a desired temperature; to provide an improved system for transmitting power from an auxiliary motor to the various devices of the auxiliary apparatus of the driving motors; and to provide a liquid pump which is also energized by the auxiliary motor for supplying liquid under pressure to a hydraulic steering system.

Further objects of the invention are to provide improved means for regulating the auxiliary motor; to provide means of this kind which includes a controllable governor; to provide temperature sensitive apparatus which is exposed to the cooling medium for actuating the controllable governor so as to increase the speed of operation of the auxiliary motor when the temperature of the cooling medium rises, thereby increasing the circulation of the cooling medium and of the lubricant through a cooler, and to increase the speed of operation of the fan; and to provide regulating means of this type which is responsive to temperature changes of the medium of the cooling system and unaffected by variations in the speed of the driving motors except as such variations affect the temperature of the cooling system.

An illustrative embodiment of the invention is shown in the accompanying drawings, in which:

Fig. 1 is a fragmentary top plan view of a vehicle chassis embodying our improved power unit.

Fig. 2 is a vertical section taken on the line 2—2 of Fig. 1.

Fig. 3 is a fragmentary side elevation, partly in section, of a vehicle showing the manner in which the power unit is arranged therein.

In the form shown, the invention is illustrated in connection with a motor bus 1, which includes a chassis 2 having a pair of independent driving wheels 3. Each driving wheel is provided with a transmission which is connected with the crank shaft of a motor 5 by a main shaft 6, the motors 5 being used solely to propel the driving wheels. Mounted between the wheel propelling motors 5 is an auxiliary motor 7 which is provided for driving the auxiliary apparatus as illustrated in Fig. 2.

The motor 7 includes a crank shaft 8 on which a pulley 9 is mounted. Mounted at one end of the crank shaft 8 and connected therewith is an air compressor 10 for supplying a pneumatic braking system 10' with a compressed medium. A generator 11 is located at the opposite end of the auxiliary engine 7 and has a rotor which is secured to the shaft of the engine. A pump 12 is also operatively connected to the left end portion of the crank shaft 8 of the auxiliary motor 7, as viewed in Fig. 2. This pump is provided for supplying oil or other suitable medium under pressure to hydraulic steering mechanism (not shown) with which the vehicle is equipped.

Supported on the rear end portion of the center beam 12' of the chassis 2 is a pair of upright supports 13 on which the rear end of a shaft housing 14 is seated. The shaft housing 14 has a gear box 15 on its forward end which is supported by a plate 17 rigidly secured to the cylinder head 18 of the engine by bolts 19. Journaled in the housing 14 is a shaft 20 on which is provided a pulley wheel 21 having a plurality of V-shaped belts 22 thereon which extend around, and are driven by the pulley wheel 9 of the auxiliary engine crank shaft. The rear end of the shaft 20 protrudes beyond the corresponding end of the housing 14 and carries a rotor 23 of a pump 24 which is employed for circulating a cooling medium through the cooling system of the power unit. A bevel gear 25 on the shaft 20 is located in the gear box 15 in mesh with a bevel gear 26 which is also confined in the gear box. The bevel gear 26 is carried by a vertically extending shaft 27 which is journalled in a shaft housing 28, the shaft housing 28 being mounted on top of the gear box 15. The vertical shaft 27 is connected by a universal joint 29 with a fan shaft 30 which is located in close proximity to the ceiling of the vehicle, as shown in Fig. 3, and which carries a rotor 31, including fan blades 32.

The shaft 20 which is driven by the belt 22 extends forwardly through and beyond the bevel gear 25 and drives a pair of pumps 33, each pump being connected with the interior of the crank case of one of the propelling engines 5 by a pipe 34. The outlets of the pumps each communicates with an oil cooler 35 from which heat is removed by the cooling medium of the cooling system of the unit. A fuel pump 36 is also operated by the forward end of the shaft 20 for supplying liquid fuel, such as gasoline, through a pipe 36' and a pipe 37', to both driving motors and to the auxiliary motor respectively.

The cooling system of the power unit included a heat interchanger or radiator 37 which is located between the ceiling 38 of the bus body and the fan 31 as illustrated in Fig. 3. Communicating with the radiator 37 is a supply reservoir 39 which is mounted on the roof of the bus body and which communicates with the radiator through a pipe 40. The radiator 37 has an outer conduit 41 which communicates at its lower end with the inlet 43 of the pump 24 and it also has an inlet pipe 42 which communicates with branch pipes 44 and 45. The branch pipe 45 communicates with the water jacket of the right driving motor 5 through an outlet 46 in the cylinder head 47' thereof, and the branch pipe 44 communicates with the water jacket of the other driving motor in a similar manner. A pipe 47 also communicates with the inlet pipe 42 of the radiator and with the outlet 48 of the water jacket of the auxiliary motor 7. Cooling medium suppy pipes 49 and 50 convey the cooling medium from the outlet 51 of the pump 24 to the driving engines 5 and the auxiliary engine 7 respectively. With this construction a common cooling system having a single radiator and fan is provided for the three motors. The lubricant cooler 35 has an inlet pipe 52 which is connected with the supply pipe 50 of the water jacket of the auxiliary motor 7 and it has an outlet pipe 53 which communicates with the return pipe 47 of the latter water jacket.

The auxiliary motor 7 has a carburetor 54 which includes a throttle valve 55 by which the speed of the motor is regulated. A controllable governor 56 is mounted on the shaft housing 28 of the vertical shaft 27 and is connected with the latter so as to be rotated in a timed relation with respect to the rotation of the crank shaft 8 of the auxiliary motor. This governor is of conventional construction and it includes control mechanism 57 having an operating arm 58 by which the governor may be set so as to re-act at predetermined rotational speeds of the shaft 27 which accordingly correspond to the rotation of the crank shaft 8 of the auxiliary motor. The governor 56 has a driven arm or lever 59 which is operatively connected by a rod 60 with the throttle valve 55 of the carburetor 54.

Thermostatic regulating mechanism is provided for varying the setting of the controllable governor 56 by manipulation of the operating arm 58. This thermostatic device is responsive to changes in the temperature of the cooling system and it includes a hermetically sealed casing 61 having an expansible bellows 62 therein. The casing 61 has a lower wall 63 in which an outlet aperture 64 and an inlet aperture 65 are formed. The apertures 64 and 65 communicated with the interior of the bellows 62 and they are connected in series with the pipes 41 and 42 which lead from the radiator 37 by conduits 66 and 67 respectively.

The interior of the bellows 62 is sealed from the space within the casing 61 surrounding it and the latter space is filled with a volatile substance 62' which expands and contracts upon increasing and decreasing changes in the temperature of the cooling medium respectively. A stem 68 is secured to the central portion of the top wall of the bellows 62 and it extends downwardly through an opening 69 in the bottom wall 63 of the casing in which it is slidably mounted. The lower end of the rod 68 is pivotally attached at 70 to the operating arm 58 of the control mechanism of the governor.

In operation, the driving motors 5 are called upon solely to propel the vehicle while the auxiliary motor 7 operates the air compressor 10 of the braking system, the generator 11, the pump 12 of the steering system, the pump and fan of the cooling system, the fuel pump which supplies fuel to the three motors and the oil withdrawing pumps of the lubricant cooling system. This construction permits the generator 11 to be operated at a substantially constant speed during varying operating speeds of the driving motors. When the vehicle is being started in motion by driving through the low and second speed transmission gears, the generator is not operated at an overloaded rate as in conventional constructions in which the driving motor of the vehicle is relied upon to also operate the generator.

As the temperature of the cooling medium in the cooling system increases the bellows 62 is compressed and the rod 68 is moved downwardly, thereby rotating the operating arm 58 in a clockwise direction. This movement of the arm 58 changes the setting of the controllable governor and causes the lever 59 of the governor to be rotated in a clockwise direction, as viewed in Fig. 2. The lever 59, through the rod 60, rotates the throttle valve 55 of the carburetor in a clockwise direction, thereby opening it so as to increase the speed of the auxiliary motor. The motor then drives the rotor 23 of the cooling medium pump and the fan 31 at a higher rate of speed. The increased circulation of the cooling medium and air through and over the radiator 37 respectively reduces the temperature of the cooling medium. In this manner the temperatures of the engines of the power unit are effectively controlled so as to maintain efficient operating conditions. As the medium cools, the volatile substance 62' contracts, allowing the bellows 62 to expand under its own resiliency. This action moves the rod 68 upwardly, resetting the controllable governor 56 to respond to the speed at which it is operated so as to rotate the lever 59 in a counter-clockwise direction. The throttle valve 55 is in turn rotated in a counter-clockwise direction by the rod 60 so as to reduce the fuel supply to the auxiliary motor, thereby decreasing its speed of operation to the speed for which the controllable governor is adjusted.

Although but one specific embodiment of this invention has herein been shown and described, it will be understood that various changes including the size, shape and arrangement of parts, may be made without departing from the spirit of our invention and it is not our intention to limit its scope other than by the terms of the appended claims.

What we claim is:

1. In a power unit, a driving motor, auxiliary apparatus including means for fueling, igniting and cooling said driving motor, a separate motor for operating said auxiliary apparatus, and regulating mechanism for the latter motor, said regulating mechanism being controllable by the temperature of said driving motor.

2. In a power unit, a driving motor, auxiliary apparatus including means for fueling, igniting and cooling said driving motor, a separate motor for operating said auxiliary apparatus, and regulating mechanism for the latter motor, said regulating mechanism being controllable by the temperature of said driving motor independently of the speed of operation of said driving motor.

3. In a power unit, a driving motor, a cooling system therefor including a cooling medium circulating pump, an auxiliary motor for operating said pump, and regulating mechanism for said auxiliary motor, said regulating mechanism being responsive to changes in the temperature of said driving motor.

4. In a power unit, a driving motor, a cooling system therefor including a cooling medium circulating pump and a fan, an auxiliary motor for operating said pump and fan, and regulating mechanism for said auxiliary motor, said regulating mechanism being responsive to changes in the temperature of said driving motor.

5. In a power unit, a driving motor, a cooling system therefor, an auxiliary motor for operating said cooling system including a carburetor, a controllable governor for regulating said carburetor, and thermostatic means for operating the control mechanism of said governor, said means being responsive to changes in the temperature of said driving motor.

6. In a power unit, a driving motor, a cooling system therefor including a cooling medium circulating pump and a fan, an auxiliary motor for operating said fan and pump having a variable carburetor, a controllable governor for regulating said carburetor, and thermostatic means responsive to changes in the temperature of the cooling medium of said cooling system for operating the control mechanism of said governor so as to vary the circulation of the cooling medium and the speed of said fan directly as the temperature of said cooling medium.

7. In a power unit, a driving member comprising an internal combustion engine, a cooling system therefor including a fan and cooling medium circulating pump, means for operating said pump and fan at various speeds irrespective of the speed of operation of said driving members, and control mechanism for said fan and pump operating means including a thermostatic member, said control mechanism being responsive to changes in the temperature of said internal combustion engine.

8. In a power unit, a driving motor, a cooling system therefor including a cooling medium circulating pump and a fan, an auxiliary motor for operating said pump and fan, and regulating mechanism for said auxiliary motor.

9. In a power unit, a driving motor, a cooling system therefor including a cooling medium circulating pump and a fan, an auxiliary motor for operating said fan and pump having a variable carburetor, a controllable governor for regulating said carburetor, and thermostatic means responsive to changes in the temperature of said engine for operating the control mechanism of said governor so as to vary the circulation of the cooling medium and the speed of said fan directly as the temperature of said driving engine changes.

CLARENCE W. MILLER.
GILBERT C. GOODE.